(12) United States Patent  
Stafford (10) Patent No.: US 8,955,533 B2
(45) Date of Patent: Feb. 17, 2015

(54) MULTIPLE PRESSURE RATIO VALVE ASSEMBLY

(71) Applicant: Sonnax Industries, Inc., Bellows Falls, VT (US)

(72) Inventor: Maura J. Stafford, Warner Robins, GA (US)

(73) Assignee: Sonnax Industries, Inc., Bellows Falls, VT (US)

( * ) Notice: Subject to any disclaimer, the term of this patent is extended or adjusted under 35 U.S.C. 154(b) by 137 days.

(21) Appl. No.: 13/912,857

(22) Filed: Jun. 7, 2013

(65) Prior Publication Data

US 2014/0360589 A1 Dec. 11, 2014

(51) Int. Cl.
*G05D 11/00* (2006.01)
*F16K 1/32* (2006.01)

(52) U.S. Cl.
CPC ........................................ *F16K 1/32* (2013.01)
USPC ................... 137/115.13; 137/118.02; 137/271

(58) Field of Classification Search
USPC .......... 137/111, 109, 115.13, 115.01, 118.02, 137/118.06, 119.01, 271
See application file for complete search history.

(56) References Cited

U.S. PATENT DOCUMENTS

| | | | | |
|---|---|---|---|---|
| 2,910,267 A * | 10/1959 | Holby | ............................ | 251/332 |
| 2,918,048 A * | 12/1959 | Aldinger et al. | .............. | 123/459 |
| 3,583,423 A * | 6/1971 | Kraakman | ................ | 137/115.13 |
| 3,785,614 A * | 1/1974 | Enomoto | ......................... | 251/63 |
| 3,880,181 A * | 4/1975 | Feroy | ............................. | 137/106 |
| 3,923,076 A | 12/1975 | Blake | | |
| 3,983,893 A | 10/1976 | Nubson | | |
| 4,074,688 A * | 2/1978 | Snyder | ........................... | 137/269 |
| 4,244,389 A * | 1/1981 | Shimoura et al. | ......... | 137/115.05 |
| 4,279,268 A * | 7/1981 | Aubert | ....................... | 137/115.26 |
| 4,325,400 A * | 4/1982 | Wynne | ........................... | 137/101 |
| 4,388,941 A * | 6/1983 | Riedhammer | ................... | 137/82 |
| 4,473,121 A * | 9/1984 | Nicholl et al. | ................. | 166/325 |
| 4,519,413 A * | 5/1985 | Wagenseil et al. | ............. | 137/111 |
| 4,546,786 A | 10/1985 | Koike | | |
| 4,667,930 A | 5/1987 | Latimer et al. | | |
| 4,838,313 A | 6/1989 | Kobayashi et al. | | |
| 5,137,048 A * | 8/1992 | Brattoli | .......................... | 137/269 |
| 5,282,604 A | 2/1994 | Wade | | |
| 5,383,812 A | 1/1995 | Tibbles | | |
| 5,513,673 A | 5/1996 | Slavin et al. | | |
| 5,762,134 A * | 6/1998 | Droste et al. | ................... | 165/284 |
| 5,772,550 A | 6/1998 | Kamanda et al. | | |
| 5,868,167 A | 2/1999 | Miki et al. | | |

(Continued)

FOREIGN PATENT DOCUMENTS

JP 11132348 5/1999

*Primary Examiner* — John Rivell
*Assistant Examiner* — Umashankar Venkatesan
(74) *Attorney, Agent, or Firm* — Downs Rachlin Martin PLLC (57) ABSTRACT

A multiple pressure ratio valve assembly is provided that may be used in a plurality of systems requiring different operating pressures. In one embodiment, a valve assembly and a plurality of interchangeable valves is provided, the interchangeable valves being configured to be installed within the same valve bore diameter, and the valves having different surface areas such that a pressure ratio of the valve assembly may be varied depending on which of the plurality of valves is installed. In some embodiments, the valves may have one or more fluid bypass portions. Embodiments of the invention may also include one or more shims that may be used to further adjust the pressure ratio of the valve assembly. Methods of repairing a valve assembly are also provided.

20 Claims, 5 Drawing Sheets

(56) References Cited

U.S. PATENT DOCUMENTS

| | | | |
|---|---|---|---|
| 6,019,011 A | 2/2000 | Monette et al. | |
| 6,257,268 B1 * | 7/2001 | Hope et al. | 137/112 |
| 6,269,827 B1 | 8/2001 | Potter | |
| 6,318,400 B1 * | 11/2001 | Hope et al. | 137/112 |
| 6,619,323 B1 * | 9/2003 | Stafford | 137/625.69 |
| 6,994,102 B2 * | 2/2006 | Yamaguchi et al. | 137/115.13 |
| 7,082,965 B2 | 8/2006 | Homes et al. | |
| 7,909,060 B2 | 3/2011 | Yamamoto et al. | |
| 8,327,884 B2 * | 12/2012 | Nishimine et al. | 137/625.66 |
| 2013/0032222 A1 * | 2/2013 | Bresnahan | 137/112 |

* cited by examiner

FIG. 10

MULTIPLE PRESSURE RATIO VALVE ASSEMBLY

FIELD OF THE INVENTION

The present invention generally relates to valve assemblies for controlling pressure in hydraulic systems. In particular, the present invention is directed to valve assemblies adapted to provide different pressure ratios and a method and kit for installing the same.

BACKGROUND

Pressure regulator valves are used in a variety of different applications to regulate the flow rate and pressure of a pressurized fluid. Many pressure regulator valves include a valve with one or more lands disposed within a valve bore. The valve may slide within the valve bore in response to changing system conditions to thereby move the one or more lands relative to openings in the valve body and thereby control a fluid pressure and flow rate. The position of the valve within the valve bore may be controlled, in part, by input control fluids that impinge upon a surface of the valve. The force the input control fluids impart on the valve will vary with the area of the surface the fluid acts on such that, for a given input control fluid pressure, the position of the valve within the valve bore will vary depending on a surface area of the lands. Thus, the ratio of the input control fluid pressure to the regulated pressure can vary depending on the surface area of the lands. The size of the valves and the size of the valve bore in a pressure regulator valve can therefore vary depending on the system pressure the pressure regulator valve is designed for. Some systems also include a boost assembly valve that is positioned adjacent to the pressure regulator valve, and that can influence the position of the pressure regulator valve, and thus, influence the regulated pressure.

A common application for pressure regulator valves and boost assembly valves is automobile automatic transmissions, where a valve assembly that includes a pressure regulator valve and a boost assembly valve is used to regulate the transmission main line pressure under varying operating conditions. In a typical transmission, the main line pressure is routed to other valves in the transmission, may be re-regulated for certain portions of the system, and is typically used to apply clutches, bands, accumulators, solenoids, the torque converter, and lubricate essential components of the system. Proper functioning of the valve assembly is therefore critical to the proper functioning of the transmission. Transmissions for larger vehicles generally require a higher main line pressure than transmissions for smaller vehicles. Also, transmissions for high performance vehicles can often require a higher main line pressure than more conventional vehicles of the same size. Thus, a separate valve assembly having a particular valve bore diameter and valve land diameters may need to be designed for each vehicle transmission according to the desired main line pressure. In addition, because of the constant movement of the valves within the valve body, the valve assembly often wears out and needs to be replaced. A manufacturer that sells replacement pressure regulator valves or boost valve assemblies, or kits for replacing valve components, generally must manufacture and sell a plurality of different valves or kits, each corresponding to a particular valve bore diameter and valve land diameter for a particular vehicle.

SUMMARY OF THE DISCLOSURE

In one implementation, the present disclosure is directed to a valve assembly for providing multiple pressure ratios within a fixed size valve bore. The valve assembly includes a valve body defining the fixed size valve bore; and a plurality of interchangeable valves, each configured and dimensioned to be separately slidably disposed within the fixed size valve bore, each valve defining at least two lands wherein at least one the valves includes a fluid bypass portion configured to allow a fluid to bypass at least one of the at least two lands when received in the fixed size valve bore such that the valve assembly provides different pressure ratios with a fixed size valve bore based on a selected valve.

In another implementation, the present disclosure is directed to a multiple pressure ratio valve assembly. The multiple pressure ratio valve assembly includes a sleeve; a plurality of interchangeable valve components configured to be movably disposed within the sleeve; wherein the valve assembly is configured for a plurality of different pressure ratios, the pressure ratio being set by selectively installing at least one of the plurality of interchangeable valve components.

In still another implementation, the present disclosure is directed to a multiple pressure ratio valve kit includes a sleeve; and a plurality of multi-land valves each having a plurality of lands, at least one of the plurality of multi-land valves having a fluid bypass portion on at least one land, each of the plurality of multi-land valves being configured and dimensioned to be slidably disposed within the sleeve; wherein the kit is compatible with a plurality of systems each having different system pressure requirements, wherein a valve assembly compatible with a particular system can be constructed from the pressure regulator valve kit by selecting and assembling one of the plurality of multi-land valves and the sleeve.

In yet another implementation, the present disclosure is directed to a method of repairing a valve with a multiple pressure ratio valve kit, the valve being disposed within a valve body and having a predetermined pressure ratio, the kit comprising a sleeve configured and dimensioned to be received in the valve body and a plurality of multi-land valves, wherein each of the valves is individually combinable with the sleeve to provide a valve assembly with a different pressure ratio. The method includes selecting the valve that in combination with the sleeve provides a pressure ratio substantially the same as the predetermined pressure ratio; and assembling the selected valve and the sleeve in the valve body to provide a valve assembly having a pressure ratio that is substantially the same as the predetermined pressure ratio.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 5-8 illustrate an exemplary embodiment of a multi-pressure valve assembly, in which

DETAILED DESCRIPTION

Various devices and methods are provided for a multiple pressure ratio valve assembly that can be used in a plurality of systems requiring different operating pressures. In one embodiment, a valve assembly and a plurality of interchangeable valves is provided, at least one of the valves having a fluid bypass portion, for example, a flat, such that the pressure ratio of the valve assembly may be varied depending on which of the plurality of valves is installed in the valve assembly. Embodiments of the invention may also include one or more shims that may be used to further adjust the operating pressure of the valve assembly.

In one exemplary embodiment, FIGS. 1-4 illustrate a multiple pressure ratio valve assembly 10 configured for use in an automobile automatic transmission. The valve assembly 10 may include a boost valve assembly 12 and a pressure regulator valve 14 slidably disposed within a valve body 40, and a spring 38 positioned between the boost valve assembly 12 and the pressure regulator valve 14. The boost valve assembly 12 may include a plurality of valves slidably disposed within a sleeve 22. For example, in the illustrated embodiment, the boost valve assembly 12 includes a cutback valve 16, an EPC valve 18x, and a reverse valve 20. As will be described more fully below, having a boost valve assembly 12 comprised of a plurality of separate valves can facilitate interchangeability of one or more of the valves, which can facilitate configuring the valve assembly 10 for a variety of pressure ratios.

The valve body 40 may include a plurality of openings that allow for fluid flow into and out of the valve 10. For example, the valve assembly 10 may include a reverse pressure opening 24, a throttle pressure opening 26, a cutback pressure opening 28, a converter pressure opening 30, a line pressure opening 32, a balance line pressure opening 34, and three exhaust openings 36, 60, and 62. Line pressure opening 32 may be connected, for example, to a T-junction with a main line pressure from an oil pump of an automobile transmission, so that, for example, if the main line pressure exceeds a certain value, the pressure regulator valve 14 can, move and open exhaust port 36, thereby allowing a portion of the line pressure to bleed off the main line and pass through the valve 10, thereby reducing main line pressure.

Figure 1:
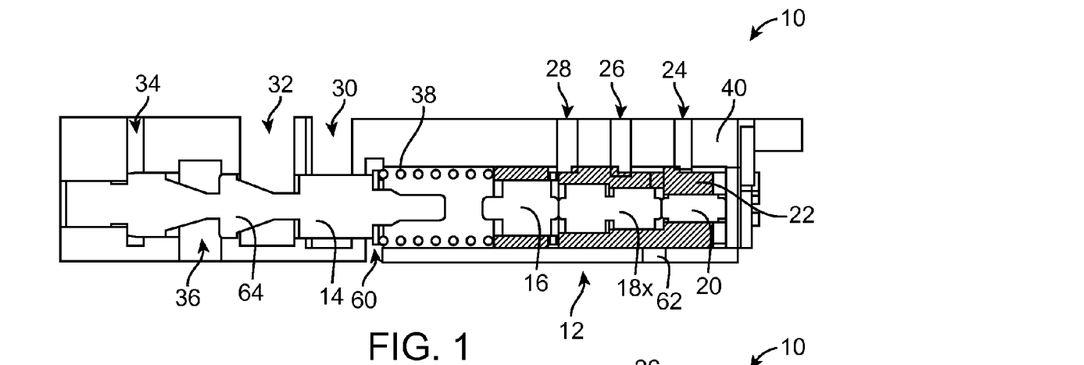
FIG. 1 is a cross-sectional view of an exemplary embodiment of a valve assembly including a pressure regulator valve and a boost valve assembly in a base line pressure condition.
Figure 2:
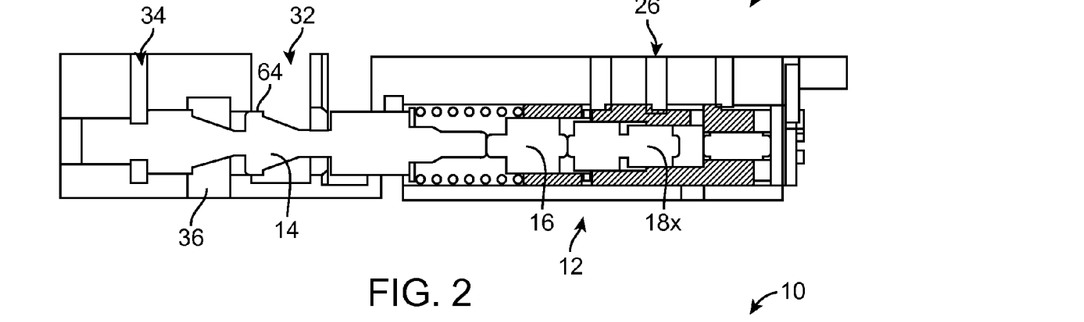
FIG. 2 is a cross-sectional view of the valve assembly shown in FIG. 1 in a position where line pressure fluid may begin to pass through the pressure regulator valve to exhaust.

In use, the valves can move back and forth within the valve body 40 in response to a balancing of forces acting on the valves. For example, in the illustrated embodiment, the spring 38 exerts a force that pushes the pressure regulator valve 14 to the left and away from the boost valve assembly 12. Pressurized fluid entering at each of the openings in the valve body 40 can also exert pressure on the valves. The axial position of the valves within the valve body 40 is determined based on the balancing of these forces. For example, FIGS. 1-4 illustrate various positions of the valves within the valve body 40 during different operating conditions. FIG. 1 illustrates the position of the valves when an engine connected to the transmission is idling and there is little to no throttle pressure at the throttle pressure opening 26. In this position, the pressure regulator valve 14 blocks the line pressure at line pressure opening 32 from passing through to the exhaust 36. In FIG. 2, main line pressure at line pressure opening 32 and reduced feed of this pressure at balance line opening 34 has exceeded a certain value, which has caused the pressure regulator valve 14 to move to the right, which allows a portion of the line pressure fluid to bypass a land 64 on the pressure regulator valve 14 and pass through to exhaust 36.

Figure 10:
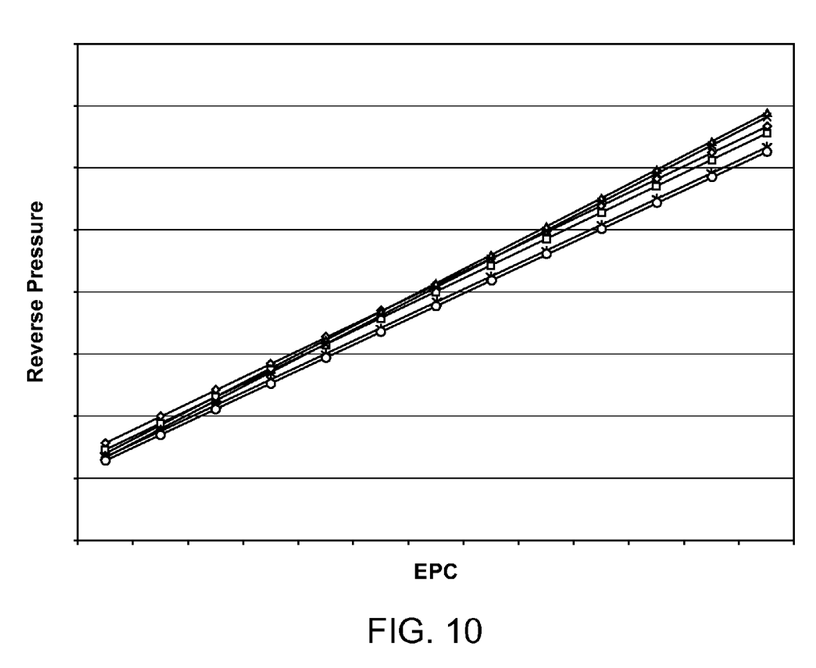

FIG. 2 illustrates operation in a forward gear, where a throttle pressure at the throttle pressure opening 26 is acting on the EPC valve 18x, causing the cutback valve 16 and EPC valve 18x to move to the left. This can cause the cutback valve 16 to slide into abutting contact with the pressure regulator valve 14 and exert a force to the left that counteracts the force from the main line pressure acting on the pressure regulator valve 14. Thus, a cutback pressure or throttle pressure can cause the pressure regulator valve 14 to be positioned further to the left than it otherwise would be for a given main line pressure. In the illustrated embodiment, a cutback pressure or throttle pressure can therefore increase main line pressure by reducing the amount of fluid that can bypass the land 64 and flow to the exhaust 36. FIG. 10, which is discussed in more detail below, illustrates a relationship between throttle pressure (X axis, labeled "EPC") and main line pressure (Y axis) for various pressure regulator valves in accordance with exemplary embodiments. As shown in FIG. 10, each of the exemplary pressure regulator valves has a pressure curve, wherein line pressure increases with throttle pressure, and for a given throttle pressure, line pressure can vary based on the characteristics of the valve.

Referring again to FIG. 2, the magnitude of the force the throttle pressure imparts on the EPC valve 18x will vary depending on the surface area of the EPC valve 18x. Thus, the force exerted on the EPC valve 18x will increase as the surface area of the EPC valve 18x increases. An EPC valve having a larger surface area can therefore result in a larger force being imparted on the EPC valve, which can, in turn, result in the cutback valve imparting a larger force on the pressure regulator valve 14. Under certain operating conditions, an EPC valve having a larger surface area may result in the pressure regulator valve 14 being positioned further to the left which can reduce the amount of line pressure fluid that bypasses the land 64, thereby resulting in a higher line pressure. Thus, in the illustrated embodiment, the ratio of the main line pressure to the throttle pressure can be varied by varying the surface area of the EPC valve 18x, where, under certain operating conditions, an EPC valve having a larger surface area can result in a higher main line pressure for a given throttle pressure. A pressure ratio of the valve 10, for example, the ratio of line pressure to throttle pressure, may be varied by varying the surface area of the EPC valve 18x. In alternative embodiments, other pressure ratios of the valve 10 may be varied by varying a surface area of one or more of the other valves.

Figure 3:
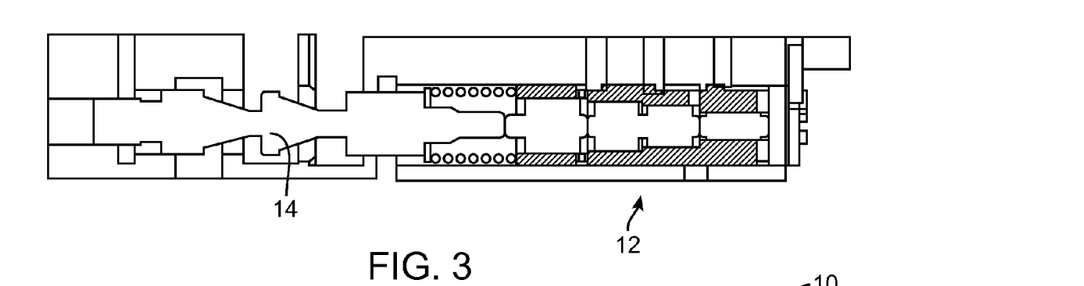
FIG. 3 is a cross-sectional view of the valve assembly shown in FIGS. 1 and 2, with the pressure regulator valve in a maximum opening position.
Figure 4:
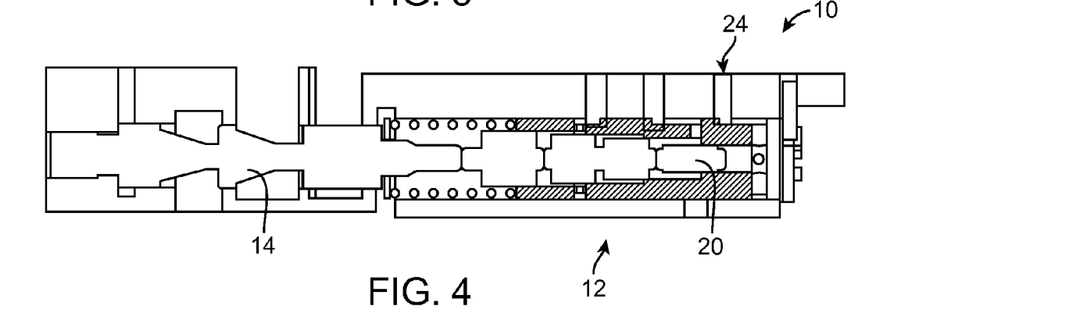
FIG. 4 is a cross-sectional view of the valve assembly shown in FIGS. 1, 2 and 3, with the valve assembly in a reverse gear position.

FIG. 3 illustrates the maximum position of the pressure regulator valve 14, where a maximum amount of line pressure may be bled to reduce line pressure. FIG. 4 illustrates a reverse gear operating condition, where reverse line pressure at the reverse line pressure opening 24 is acting on the reverse valve 20, causing the boost valve assembly 12 to move to the left and exert a force on the pressure regulator valve 14.

Figure 5:
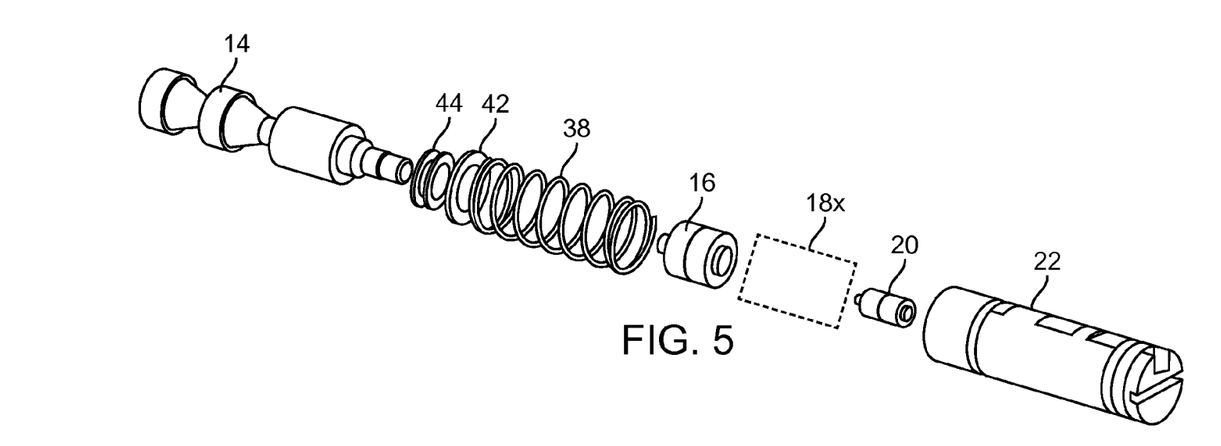
FIG. 5 is an exploded isometric view of a portion of the valve assembly shown in FIGS. 1-4, FIGS. 6 and 7 are isometric views of two exemplary EPC valves that may be interchangeably used in the boost valve assembly shown in FIGS. 1-5.

As shown in FIG. 5, the cutback valve 16, the EPC valve 18x, and the reverse valve 20 may be separate components configured to move relative to each other within the valve bore and may be configured to come into abutting contact with one another. Valve assembly 10 may be configured as a multi-pressure ratio valve assembly by varying a surface area of one or more of the valves. In the illustrated embodiment, a surface area of the EPC valve 18x may be varied to change a pressure ratio of the valve 10, for example, the ratio of throttle pressure to line pressure. In some embodiments, the valve 10 can include a plurality of interchangeable EPC valves 18x, wherein each of the plurality of EPC valves 18x has a different surface area, such that the pressure ratio of the valve 10 can be changed by selectively installing one of the interchangeable EPC valves 18x. Each of the plurality of EPC valves 18x may be configured to be slidably disposed within the same valve bore diameter, such as within the same sleeve 22. The valve 10 can therefore have a single valve body 40 and a single sleeve 22 and can be configured to have a plurality of pressure ratios by selectively installing one of the plurality of EPC valves 18x.

The surface area of the EPC valve 18x may be varied in a variety of different ways. In some embodiments, the EPC valve 18x may be manufactured with a plurality of lands, wherein each of the lands on a given valve may have a different maximum outer diameter than the other lands on the valve. One of the lands on each valve can be designated as the priority land, or the land that the throttle pressure will act on, and one or more fluid bypass portions can be added to the one or more other lands such that an EPC feed oil passing through throttle pressure opening 26 bypasses the other land(s). The fluid bypass portion may be formed in a variety of different ways. In some embodiments, a fluid bypass portion may be one or more reduced area portions formed, for example, on an outer circumferential surface of the land(s). In other embodiments, a fluid bypass portion may include one or more orifices formed in one or more of the lands.

Figure 6:
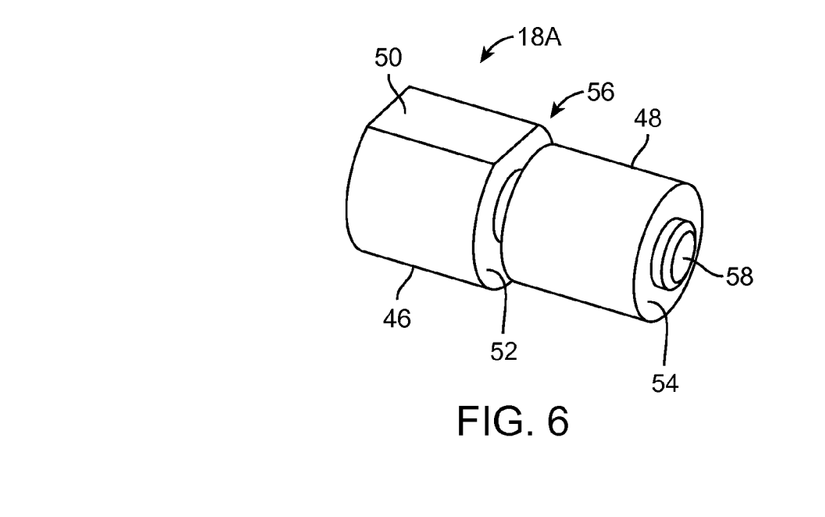
Figure 7:
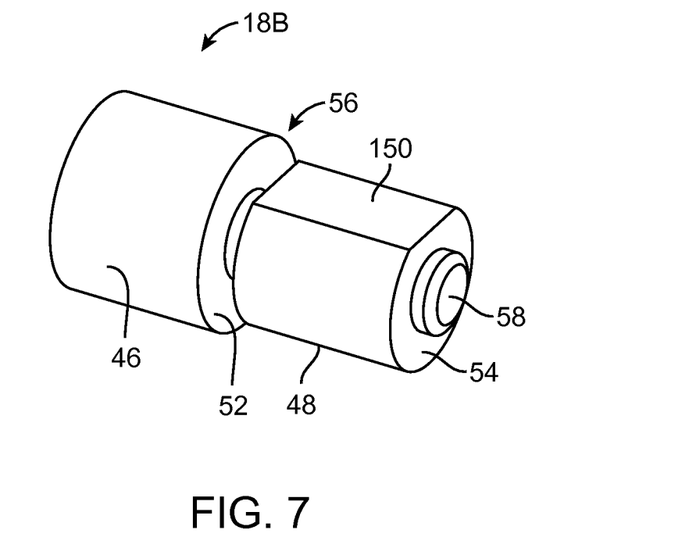

FIGS. 6 and 7 illustrate two alternative EPC valves 18x (18A and 18B respectively), where the land face surface area of the EPC valve 18x is varied by combining a plurality of different-diameter lands with the selective positioning of a fluid bypass portion. In the illustrated embodiment, an EPC valve 18A and an EPC valve 18B each have a first large diameter land 46 and a second, small diameter land 48 separated by a groove 56. The EPC valves 18A and 18B may also have a contact point 58 that may extend from an end of the small diameter land 48 that is configured to come into abutting contact with, for example, the reverse valve 20. The large diameter land 46 on the EPC valves 18A and 18B has a larger maximum outer diameter than a maximum outer diameter of the small diameter land 48.

In the illustrated embodiment, the surface area of the EPC valves 18A and 18B is varied by selectively placing a fluid bypass portion on one of the lands. For example, as shown in FIG. 6, EPC valve 18A has a fluid bypass portion in the form of a flat 50 on an outer circumferential surface of the large diameter land 46. In the illustrated embodiment, the flat 50 extends in an axial direction across an entire thickness of the land 46 from a first face 52 to a second face of the land, and extends in a lateral direction across an entire width of the land. In the illustrated embodiment, the flat 50 is formed in a plane that is substantially perpendicular to a radius of the land 46 and that is offset from a central longitudinal axis of the land 46. In alternative embodiments, the flat may be formed in a plane that is non-perpendicular to a radius of the land 46 and that is offset by a different amount from a central longitudinal axis of the land 46, including being formed in a plane that extends through the central longitudinal axis of the land 46. In alternative embodiments, EPC valve 18A can have a fluid bypass portion having a variety of other configurations, including having two or more flats located at a plurality of different circumferential positions, and being formed in other geometries, including concave and v-shaped regions. In addition, a reduced area portion can be formed from one or more orifices. For example, an orifice can be created in the form of a cylindrical hole having a central longitudinal axis that is substantially parallel to a central longitudinal axis of EPC valve 18A. In alternative embodiments, the orifice may be non-parallel to the central longitudinal axis of the EPC valve 18A. The orifice(s) could be formed, for example, by drilling one or more holes from the first face 52, through the land 46 to the opposite face of the land 46. FIG. 7 illustrates an alternative EPC valve 18x configuration where EPC valve 18B has a flat 150 formed on an outer circumferential surface of the small diameter land 48.

In the embodiment illustrated in FIG. 6, the small diameter land 48 is the priority land, such that the throttle pressure will act on land face 54. If any EPC feed oil leaks past the small diameter land 48, the flat 50 would allow the leakage flow to bypass the large diameter land 46. Thus, the force of an input fluid acting on the EPC valve 18A would primarily be from the fluid acting on the face 54 of the small diameter land 48. In the embodiment shown in FIG. 7, the placement of the flat 150 on the small diameter land 48 allows EPC feed oil to bypass the land 48. Thus, the force of an input fluid acting on the EPC valve 18B would primarily be from the fluid acting on the face 52 of the large diameter land 46.

In the illustrated embodiment, both EPC valves 18A and 18B are configured and dimensioned to be slidably disposed within the sleeve 22, such that either of EPC valve 18A or 18B may be interchangeably installed in the valve 10. Thus, because the EPC valves 18A and 18B have different land face surface areas and different fluid bypass portions, the valve assembly 10 will have a different pressure ratio depending on which of the EPC valves 18A or 18B is installed. For example, because the EPC valve 18A has a flat 50 on the large diameter land 46, in use, a throttle pressure at throttle pressure opening 26 (shown in FIGS. 1-4) will impart a smaller force on the EPC valve 18A than EPC valve 18B, which has a flat on the small diameter land 48. Therefore, under certain operating conditions, the EPC valve 18B may impart a larger force on the pressure regulator valve 14 (shown in FIGS. 1-5) than EPC valve 18A, which can result in the pressure regulator valve 14 being positioned further to the left in the valve assembly 10 (shown in FIGS. 1-4). Thus, the ratio of the line pressure to the throttle pressure will be greater when EPC valve 18B is installed in the valve 10 than when EPC valve 18A is installed. The valve assembly 10 can therefore have a plurality of interchangeable valves, at least one of the valves having a fluid bypass portion, for example, a flat, such that the pressure ratio of the valve assembly may be varied depending on which of the plurality of valves is installed in the valve assembly. Preferably, each of the interchangeable valves has at least one fluid bypass portion on at least one land.

While, in the illustrated embodiments, the surface area of the EPC valve 18x is varied by utilizing two lands, in alternative embodiments, a single land, or three or more lands may be used. For example, if three different pressure ratios were desired, an EPC valve could include three lands each having a different diameter. For each valve assembly, one of the three lands could be chosen as the priority land, and reduced area portions could be formed in the other two lands. Thus, three different valve pressure curves could be obtained by selectively installing one of the three EPC valves. Also, alternative reduced area portions may include geometries other than flats, for example, v-shaped or concave shaped areas. In addition, while only one reduced area portion is illustrated in the form of a single flat, in alternative embodiments, a land may have a plurality of reduced area portions located at any circumferential location on the land. In addition, while the illustrated embodiment includes a plurality of interchangeable EPC valves, in alternative embodiments, a plurality of interchangeable valves having different surface areas could be utilized for one or more of the other valves in the valve assembly. In addition, while the illustrated embodiment discloses a multiple pressure ratio valve assembly including a pressure regulator valve and boost valve assembly for use in an automatic transmission, interchangeable valves with specifically placed reduced area portions may also be used in any other valve to enable a multiple pressure ratio valve.

By providing a single valve body having a particular valve bore and a plurality of interchangeable valve valves, the manufacturing of valve assemblies configured for use in a plurality of different systems can be simplified. For a non-limiting example, a manufacturer that produces two transmissions, each configured for a different main line pressure, may avoid having to develop the tooling for two completely different boost valve assemblies. Instead, a single boost valve assembly design, including a single sleeve design, may be developed along with two interchangeable valve designs, and a boost valve assembly for a particular transmission may be assembled by selectively installing one of the interchangeable valves in the valve body. In addition, to further simplify manufacturing, a single multiple-land valve design may be manufactured and a reduced area portion may be selectively added to one or more of the lands in a post-processing step, which may further simplify manufacturing. For example, in the illustrated embodiment, the EPC valves 18A and 18B, may each originate from the same part design, with the valves being differentiated in a post-processing step where one or more portions of material may be removed from the outer circumferential surface of one of the lands, such as by machining the flat 50 or the flat 150. In addition, configuring the boost valve assembly 12 with a plurality of separate valves, such as the EPC valve 18x, the cutback valve 16 and the reverse valve 20, facilitates the post-processing step of selectively forming a reduced area portion on any one of the lands of the plurality of valves without concern for damaging a surface of a land of a valve not having a reduced area portion.

For an additional non-limiting example, the ease of manufacturing enabled by the multiple pressure ratio valve assembly 10 may also provide benefits for manufacturers selling transmission replacement parts. Instead of manufacturing and selling separate boost valve assemblies, each having a different valve bore diameter, different boost valve assembly sleeve diameter, and different valve land diameters, a manufacturer may instead sell a single replacement kit having a single valve body, a single boost valve assembly sleeve, and a plurality of interchangeable valves having specifically placed flats, such that a single kit may be used to replace a plurality of different pressure-ratio pressure regulator valves.

For a non-limiting example of an application of the multiple pressure ratio valve assembly, a multiple pressure ratio boost valve assembly may be used to provide a multiple pressure ratio boost valve assembly kit that may be used to repair a plurality of different boost valves in a series of transmissions. In one exemplary embodiment, such transmissions may be those used in Toyota vehicles having the model number A340E. The A340E transmission has three variations of pressure regulator valve boost assemblies that vary with vehicle type. The EPC valve land diameter in the three A340E pressure regulator valve boost assemblies is either approximately 0.354 inches or approximately 0.427 inches. A multiple pressure ratio pressure regulator valve boost assembly may be used to provide a replacement kit that may include a single boost assembly sleeve and two multi-land EPC valves. Each of the EPC valves may have a first land with a diameter of approximately 0.427 inches and a second land with a diameter of approximately 0.354 inches. One of the multi-land EPC valves may have a fluid bypass region such as a flat on the 0.427 inch land and the second multi-land EPC valve may have a fluid bypass region on the 0.354 inch valve. If a pressure regulator valve boost valve assembly having a 0.427 inch EPC valve is being repaired or replaced, the multi-land EPC valve having a fluid bypass area on the 0.354 inch land would be selected and installed. If a pressure regulator valve boost valve assembly having a 0.354 inch EPC valve is being repaired or replaced, the other multi-land EPC valve would be selected and installed. Thus, a single pressure regulator valve boost valve assembly repair kit may be provided having a single valve body, a single sleeve, and at least two multi-land valves that may be used to replace a plurality of pressure regulator valve boost valve assemblies having different pressure ratios.

As shown in FIG. 5, the multiple pressure ratio valve assembly 10 may also include one or more shims 44 which may be used to adjust the main line pressure of the valve assembly 10. For example, in the illustrated embodiment, two shims 44 are placed adjacent to a washer 42. When the components are assembled, the addition of the shims 44 further compresses the spring 38 which alters the balance of forces acting on the valves and may therefore alter the position of the pressure regulator valve 14 and the boost valve assembly 12 for a given set of fluid input pressures, which will alter the main line pressure of the valve 10. The use of the shims 44 may further simplify the manufacturing of the valve assembly 10 by enabling a simplified sleeve 22.

Figure 8:
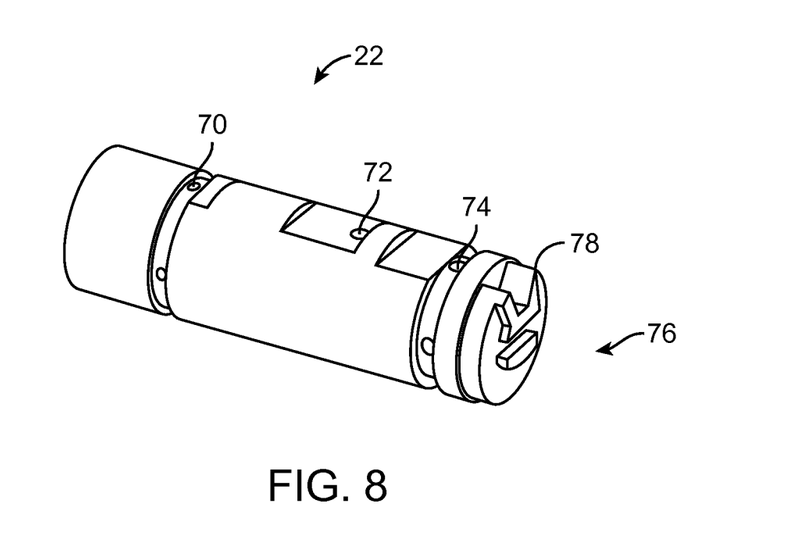
FIG. 8 is an isometric view of the boost valve assembly sleeve in the valve shown in FIGS. 1-5.

For example, as shown in FIG. 8, the sleeve 22 may have a planar distal face 76 and a single locking feature 78 extending from the distal face 76. The locking feature 78 may be configured to ease installation of the sleeve 22, and to mate with complementary features on the valve body 40. While, in the illustrated embodiment, the pressure ratio of the valve 10 may be adjusted by the addition of the shims 44, some prior art designs included a more complex sleeve distal face, for example, a distal face with a plurality of locking features extending different depths into the sleeve. In the prior art configuration, the pressure ratio of the valve is adjusted by selecting one of the locking features. While the more complicated prior art sleeve may be used with the multiple pressure ratio valves disclosed herein, the addition of the shims 44 obviates the need for the more complex sleeve design, which may further simplify manufacturing, reduce costs, and ease installation of the valve assembly 10 by enabling a simpler sleeve with a single locking feature 78. As shown in FIG. 8, the sleeve 22 may also have input ports 70, 72, and 74 that enable the various input ports on the valve body 40 to be in fluid communication with the boost valve assembly valves.

Figure 9:
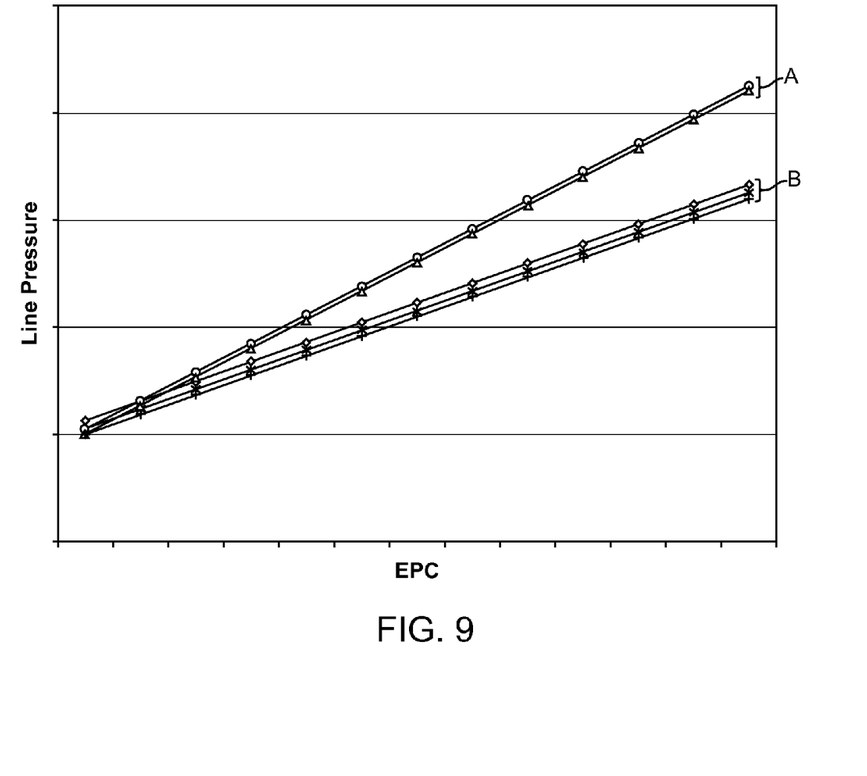
FIGS. 9 and 10 are pressure curves for exemplary embodiments of valve assemblies having differently-sized EPC valves and varying numbers of shims.

FIG. 9 is a graph of pressure curves for various transmission pressure regulator valves. As shown in FIG. 9, the main line pressure (Y axis, labeled "line pressure") increases with throttle pressure (X axis, labeled "EPC"). In the illustrated embodiment, the two pressure curves labeled "A" illustrate the pressure curves of valves having a large diameter priority EPC valve, such as EPC valve 18B, and the three pressure curves labeled "B" illustrate pressure curves for valves having a small diameter priority EPC valve, such as EPC valve 18A. Thus, as can be seen in FIG. 9, having a large diameter priority EPC valve results in a higher line pressure for a given throttle pressure than a valve having a small diameter EPC valve. The variation in the group A pressure curves can be from the addition of one or more of the shims 44, and similarly, the variation in the group B curves can be from the addition of one or more of the shims 44. FIG. 10 illustrates reverse pressure curves of transmission pressure regulator valves having EPC valves of different land face surface areas, and with and without shims. As can be seen in FIG. 10, a valve's reverse pressure curve may be varied by varying the number of shims and/or the EPC valve land face surface area.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A valve assembly for providing multiple pressure ratios within a fixed size valve bore, comprising:
    a valve body defining the fixed size valve bore; and
    a plurality of interchangeable valves, each configured and dimensioned to be separately slidably disposed within said fixed size valve bore, each valve defining at least two lands wherein at least one said valve includes a fluid bypass portion configured to allow a fluid to bypass at least one of said at least two lands when received in said fixed size valve bore such that said valve assembly provides different pressure ratios with a fixed size valve bore based on a selected said valve.

2. The valve assembly of claim 1, wherein said valve body and one of said plurality of interchangeable valves comprises a boost valve, and wherein said valve assembly further comprises a pressure regulator valve slidably disposed within said fixed size valve bore and a spring disposed between said pressure regulator valve and said boost valve.

3. The valve assembly of claim 2, wherein said at least two lands have different outer diameters mated to corresponding sections of the fixed size valve bore.

4. The valve assembly of claim 3, wherein one of said interchangeable valves has a fluid bypass portion on a large diameter land, and another one of said interchangeable valves has a fluid bypass portion on a small diameter land.

5. The valve assembly of claim 1, wherein said fluid bypass portion comprises at least one flat, at least one concave surface, at least one v-shaped area, or at least one orifice.

6. The valve assembly of claim 1, wherein said valve body comprises a valve sleeve, said valve sleeve defining said valve bore.

7. The valve assembly of claim 1, further comprising a spring disposed within said valve body and a shim positioned adjacent to said spring, said shim being configured to adjust an operating pressure of said valve assembly by changing a preload of said spring.

8. A multiple pressure ratio valve assembly, comprising:
    a sleeve;
    a plurality of interchangeable valve components configured to be movably disposed within said sleeve;
    wherein said valve assembly is configured for a plurality of different pressure ratios, said pressure ratio being set by selectively installing at least one of said plurality of interchangeable valve components.

9. The valve assembly of claim 8, wherein said valve body has a fixed size valve bore, and wherein each of said interchangeable valve components are configured and dimensioned to be slidably disposed within said valve bore.

10. The valve assembly of claim 8, wherein said plurality of interchangeable valve components comprises a plurality of multi-land valves, and wherein at least one of said plurality of multi-land valves has a land with a fluid bypass portion.

11. The valve assembly of claim 10, wherein at least one of said plurality of multi-land valves has a large diameter land and a small diameter land, said large diameter land having a maximum outer diameter that is greater than a maximum outer diameter of said small diameter land.

12. The valve assembly of claim 10, wherein at least two of said multi-land valves each have a first land and a second land, said first lands having substantially the same maximum outer diameter, and said second lands having substantially the same maximum outer diameter.

13. The valve assembly of claim 8, further comprising a spring disposed within said valve body and a shim positioned adjacent to said spring, said shim being configured to adjust a baseline pressure of said valve by changing a preload of said spring.

14. A multiple pressure ratio valve kit comprising:
    a sleeve; and
    a plurality of multi-land valves each having a plurality of lands, at least one of said plurality of multi-land valves having a fluid bypass portion on at least one land, each of said plurality of multi-land valves being configured and dimensioned to be slidably disposed within said sleeve;
    wherein said kit is compatible with a plurality of systems each having different system pressure requirements, wherein a valve assembly compatible with a particular system can be constructed from said pressure regulator valve kit by selecting and assembling one of said plurality of multi-land valves and said sleeve.

15. The kit of claim 14, wherein each of said multi-land valves has a first land with a first outer diameter and a second land with a second outer diameter, said first outer diameter being different than said second outer diameter.

16. The kit of claim 15, wherein one of said first land and said second land is substantially cylindrical and the other one of said first land and said second land is non-cylindrical.

17. A method of repairing a valve with a multiple pressure ratio valve kit, said valve being disposed within a valve body and having a predetermined pressure ratio, said kit comprising a sleeve configured and dimensioned to be received in said valve body and a plurality of multi-land valves, wherein each of said valves is individually combinable with said sleeve to provide a valve assembly with a different pressure ratio, said method comprising:
    selecting the valve that in combination with said sleeve provides a pressure ratio substantially the same as said predetermined pressure ratio; and
    assembling the selected valve and said sleeve in said valve body to provide a valve assembly having a pressure ratio that is substantially the same as said predetermined pressure ratio.

18. The method of claim 17, wherein each of said valves has at least two lands, and at least one of said valves has a fluid bypass portion on at least one land.

19. The method of claim 17, wherein the selected valve has a land with an outer diameter that is approximately the same as an outer diameter of a land of a valve being replaced.

20. The method of claim 17, wherein said assembling step further comprises installing a spring in said valve body and said method further comprises a pressure ratio tuning step, wherein one or more shims are positioned adjacent to said spring to thereby adjust a preload of said spring.

* * * * *